(12) United States Patent
Chen

(10) Patent No.: US 7,392,972 B2
(45) Date of Patent: Jul. 1, 2008

(54) CERAMIC VALVE STRUCTURE WITH SLOW-DESCENDING DEVICE

(76) Inventor: Mei-Li Chen, No. 1-2, Lane 73, Sec. 2, Jhongshan Rd., Tanzih Township, Taichung County (TW)

( * ) Notice: Subject to any disclaimer, the term of this patent is extended or adjusted under 35 U.S.C. 154(b) by 272 days.

(21) Appl. No.: 11/436,942

(22) Filed: May 19, 2006

(65) Prior Publication Data

US 2007/0267586 A1 Nov. 22, 2007

(51) Int. Cl.
  *F16K 31/12* (2006.01)
(52) U.S. Cl. .................. 251/54; 251/64; 137/625.17
(58) Field of Classification Search ............... 251/54, 251/64; 137/625.17, 625.4
  See application file for complete search history.

(56) References Cited

U.S. PATENT DOCUMENTS 4,112,966 A * 9/1978 Carlson ..................... 137/282
4,723,574 A * 2/1988 Bergmann et al. ...... 137/625.17
4,736,772 A * 4/1988 Ostertag et al. ........ 137/625.17
5,301,716 A * 4/1994 Bergmann ............. 137/625.17
5,413,144 A * 5/1995 Riis ....................... 137/625.17
5,570,720 A * 11/1996 Riis ....................... 137/625.17

* cited by examiner

*Primary Examiner*—John K Fristoe, Jr.
(74) *Attorney, Agent, or Firm*—Egbert Law Offices

(57) ABSTRACT

The ceramic valve structure has a slow-descending device between the valve stick and the valve shaft base. The slow-descending device mentioned herein includes a piston, a piston slot and sealer, and the piston slot is placed on one side of the valve shaft base. A venthole is placed at the bottom of the piston slot, and the bottom of the piston is placed inside the piston slot. The joint of the top of the piston slot is connected to the swing end. The sealer is placed on top of the venthole of the piston. When the valve stick of the ceramic valve is being turned off, it creates a resistance by the slow-descending device, which slows the process of water being tuned off, in turn, slowing down the change in water pressure, reducing damage to the water channel and ceramic valve, and extending a shelf life of the ceramic valve structure.

4 Claims, 5 Drawing Sheets

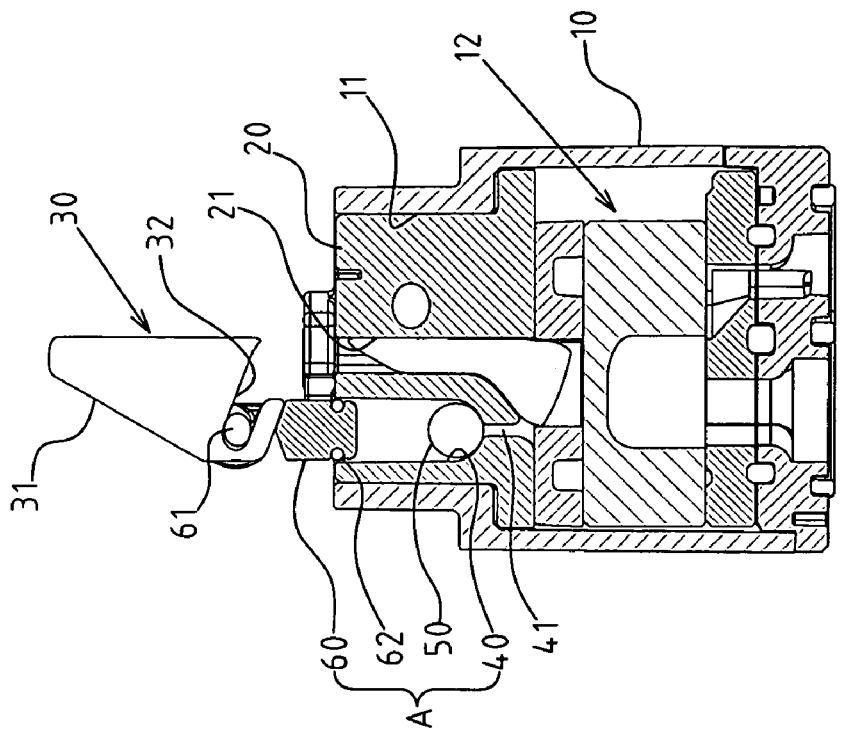
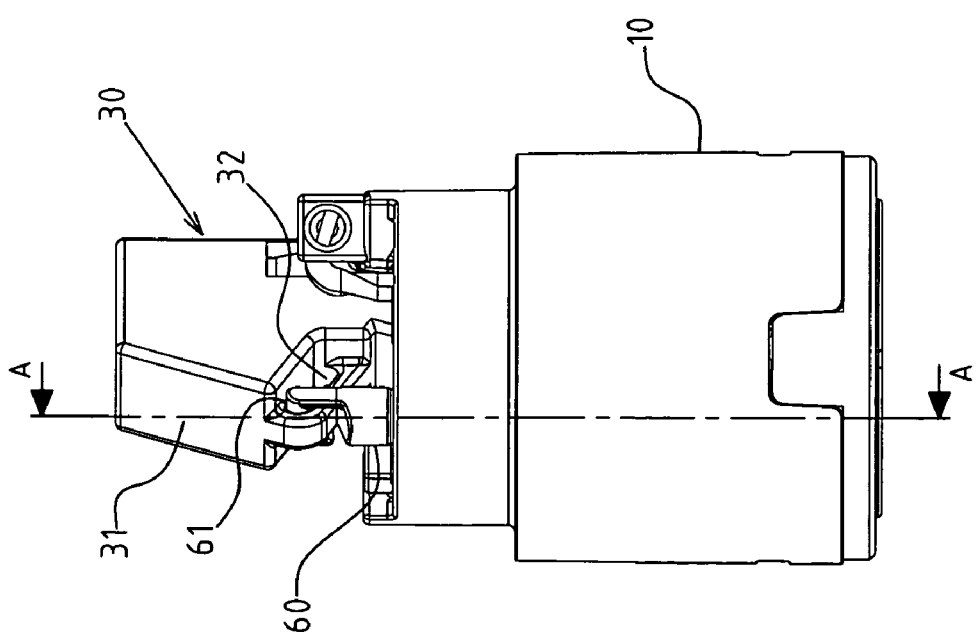

CERAMIC VALVE STRUCTURE WITH SLOW-DESCENDING DEVICE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a ceramic valve structure, and more particularly to a structure with a slow-descending device.

BACKGROUND OF THE INVENTION

In a ceramic valve structure, the on and off of the water flow and the adjustment of water temperature is achieved by turning the valve thereof. The top of the valve mentioned herein is for a faucet knob. By so doing, when the user is turning the faucet knob, it indirectly controls the ceramic valve. When the valve is turned, though the fraction between the inner valves has certain resistance, the valve will not be too loose when the user is operating the faucet knob. However, being designed toward one side and the faucet knob itself having a certain weight, in terms of operation, when the user desires to shut the water off, the shutting off can be achieved by pressing the faucet knob easily to drive the valve of the ceramic valve to turn the valve to the off angle to stop the water flow. This operation process seem reasonable, however, in terms of practicability, it may cause some serious problems. Examples are provided as follows.

Today, people live in high-rise buildings, and the water tower is placed on top of the buildings. The water is supplied through the channels placed through out the building. Because the capacity of the water tower in these types of building is larger than a regular household, the pressure created for the water channel is high. The lower floor has higher pressure because of the distance from the water tower. Water pressure that is the same as the pressure under the normal state is not the biggest threat for the water channel. It easily causes the damage and leakages at the connection of the water channel, which comes from the rapid change of the water pressure, and the reason for the change in the water pressure usually is caused by the household turning on and off of the water. When the water is turning from on to off, because of the opposite pressure is placed on the water channel, the damage to the water channel is most serious. Therefore, going back to the conventional faucet knob and the movement of the ceramic valve, the valve of the conventional ceramic valve stick can be turned to off easily, which causes rapid change in the process of shutting off the water. This process causes the opposite pressure of water flow instantly on the water channel, which causes damage on the wall of the water channel and its connection, in turn shortening the shelf life of the water channel and in turn shortening the shelf life of the water channel components of the ceramic valve. Although the user can shut off the water slowly when shutting off the conventional faucet knob, for many users, the habit of shutting off water speedily is hard to change. Therefore, this structure is designed to assist this operational effect.

Thus, to overcome the aforementioned problems of the prior art, it would be an advancement in the art to provide an improved structure that can significantly improve the efficacy.

To this end, the inventor has provided the present invention of practicability after deliberate design and evaluation based on years of experience in the production, development and design of related products.

BRIEF SUMMARY OF THE INVENTION

The improved fact of the present invention from the conventional technique is described herein. In the prior art, the conventional valve stick of the ceramic valve is easy to be turned off, which makes the process of shutting off water flow too fast, and causes the instant force on the water channel, damaging the channel and ceramic valve structure and shortening the shelf life. In the present invention, the slow-descending device A is added. When the user desires to turn off the faucet knob 70, it also moves the swing end 31 of the valve shaft 30, and with the movement of the swing end 31, the joint 61 of the piston 60 is moved downward by the swing end 31. When the piston 60 is moved downward, it creates a pushing force inside the piston slot 40, at this time. The air pressure inside the piston slot 40 is unable to be released, and it must push against the weight of the sealer 50, then be released from the hole between the sealer 50 and venthole 41, which forms certain resistance of air pressure, and creates anti resistance force against the piston 60. Thus, the downward movement of the piston 60 has resistance. Also, when the user is turning off the faucet knob 70, the slow-descending device A creates slow-descending effect for the movement of the swing end 31 of the valve shaft 30, and slows down the change in water pressure when turning off water, which reduces the damage to the water channel and the structure of the porcelain. This effect achieves the practicability of extending shelf life.

Although the invention has been explained in relation to its preferred embodiment, it is to be understood that many other possible modifications and variations can be made without departing from the spirit and scope of the invention as hereinafter claimed.

BRIEF DESCRIPTION OF THE SEVERAL VIEWS OF THE DRAWINGS

FIG. 2 a side elevation view of the preferred embodiment of the present invention.

FIG. 3 shows the sectional view of FIG. 2 across line A-A.

FIG. 4 shows a side elevation view of the operation of the present invention, in which the water is turned on.

DETAILED DESCRIPTION OF THE INVENTION

The features and the advantages of the present invention will be more readily understood upon a thoughtful deliberation of the following detailed description of a preferred embodiment of the present invention with reference to the accompanying drawings.

Figure 1:
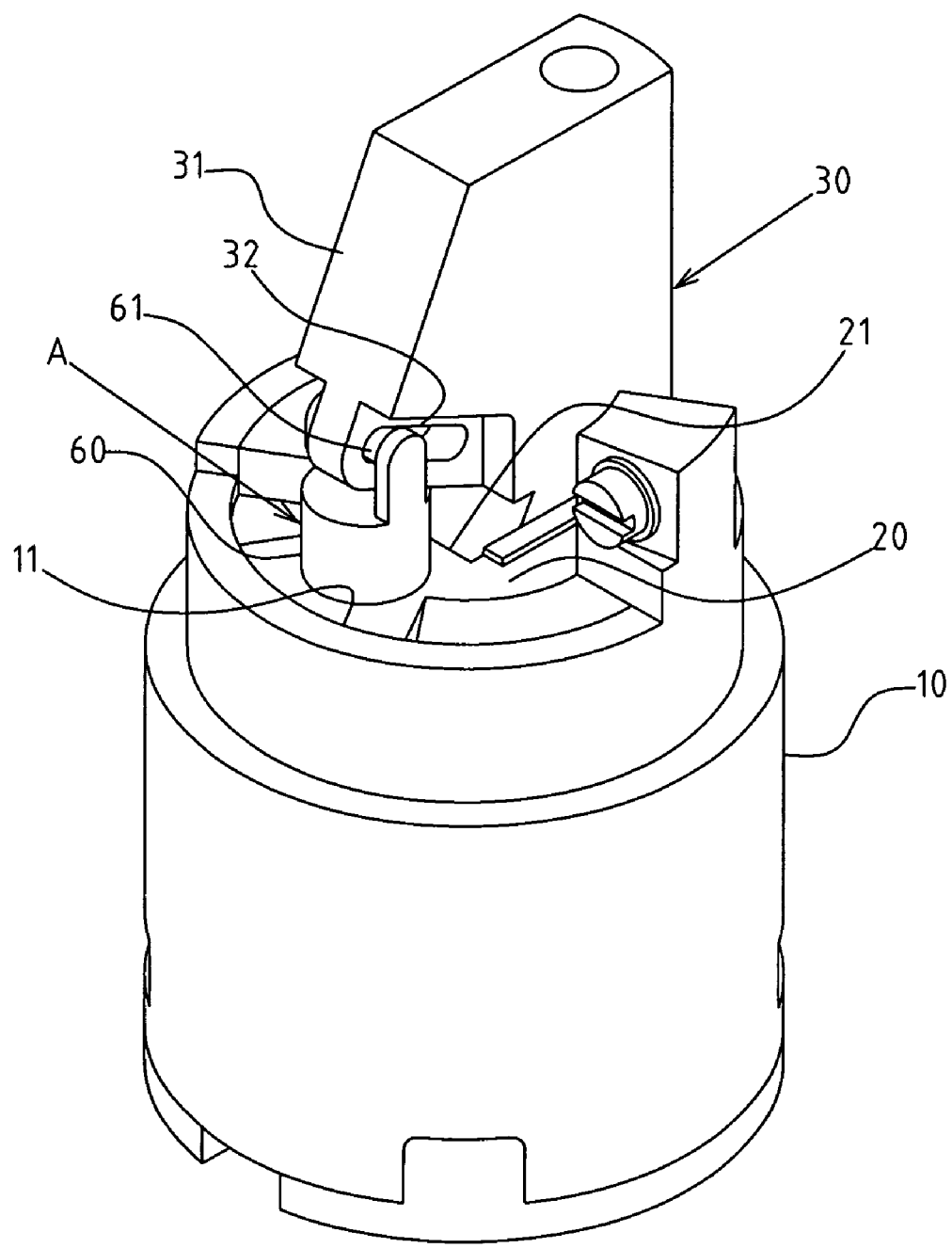
FIG. 1 shows a perspective view of the preferred embodiment of the present invention.

As shown in FIGS. 1-3, there is a preferred embodiment of a ceramic valve structure with slow-descending device. The present detailed description of the present invention is based on a typical preferred embodiment, placing no restriction on claims.

The invention includes a ceramic body 10, which has a containment slot 11 on the top, and the inside of the ceramic valve body 10 has a water control component 12 (as shown in FIG. 3). However, the water control component 12 mentioned above is a component of the ceramic valve, and is not directly related to the technical feature disclosed in the present invention, therefore, it is not described in detail herein.

A valve shaft base 20 is placed inside the containment slot 11 of the ceramic valve body 10, and is rotatable. The valve shaft base 20 has a valve shaft slot 21.

A valve shaft 30 has a bottom thereof placed inside the valve slot 21 of the valve shaft base 20, and the top of the valve shaft 30 is a swing end 31.

A slow-descending device A is placed between the swing end 31 of the valve shaft 30 and the valve shaft base 20.

Figure 8:
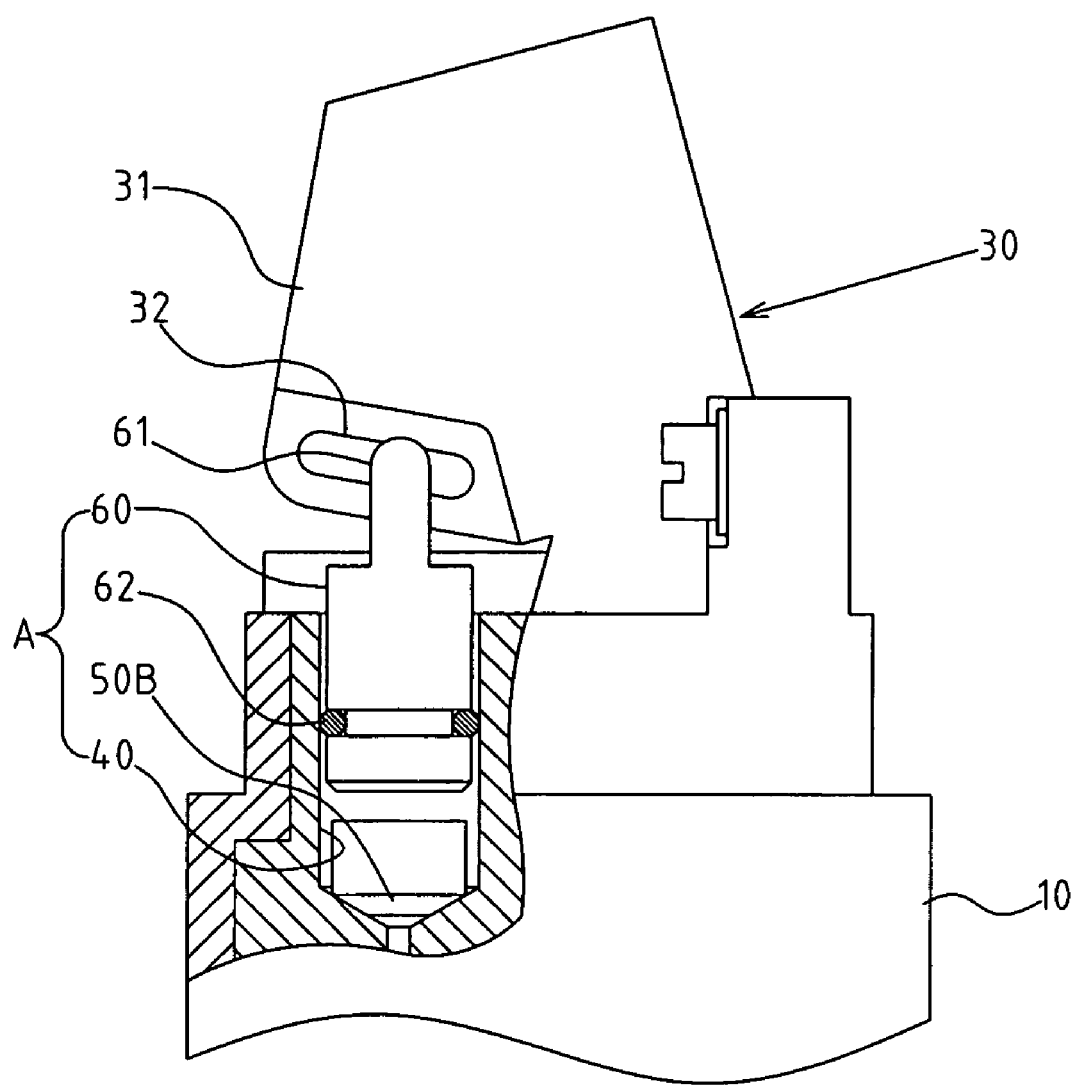
FIG. 8 shows an elevation and partial sectional view of another embodiment of the sealer of the present invention.

The slow-descending device A includes a piston slot 40, which is placed on one side of the valve shaft base 20, and a venthole 41 is placed at the bottom of the piston slot 40. The bottom of the venthole 41 of the present invention is connected to the bottom of the valve shaft base 20. A sealer 50 is placed on the top of the venthole 41 of the piston slot 40, so that the venthole 41 is sealed under normal circumstances, and the sealer can be a bearing like structure (such as steel ball) shown in FIG. 3, or like the sealer 50B shown in FIG. 8, which is a cone like structure.

The invention also has a piston 60, which is stick like, and its bottom is placed inside the piston slot 40 in a sealed condition. A joint 61 is placed on top of the piston 60 and is connected to the pre-determined area on the swing end of the valve stick. The bottom of the piston 60 is sealed to the piston slot 40 with O shaped ring 62.

Among them, a joint of the top end of the piston can be a hook, so that the swing end of the valve shaft has a horizontal slot on its corresponding part for the joint of the piston to connect.

Through the above structure and design, the operation of the present invention is explained herein.

Figure 5:
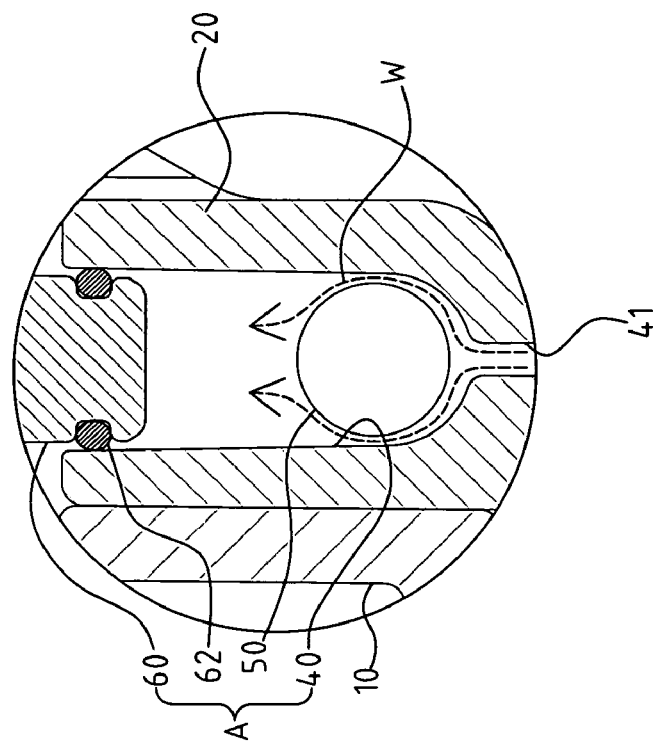
FIG. 5 shows a partial sectional view of the slow-descending device in FIG. 4.
Figure 4:
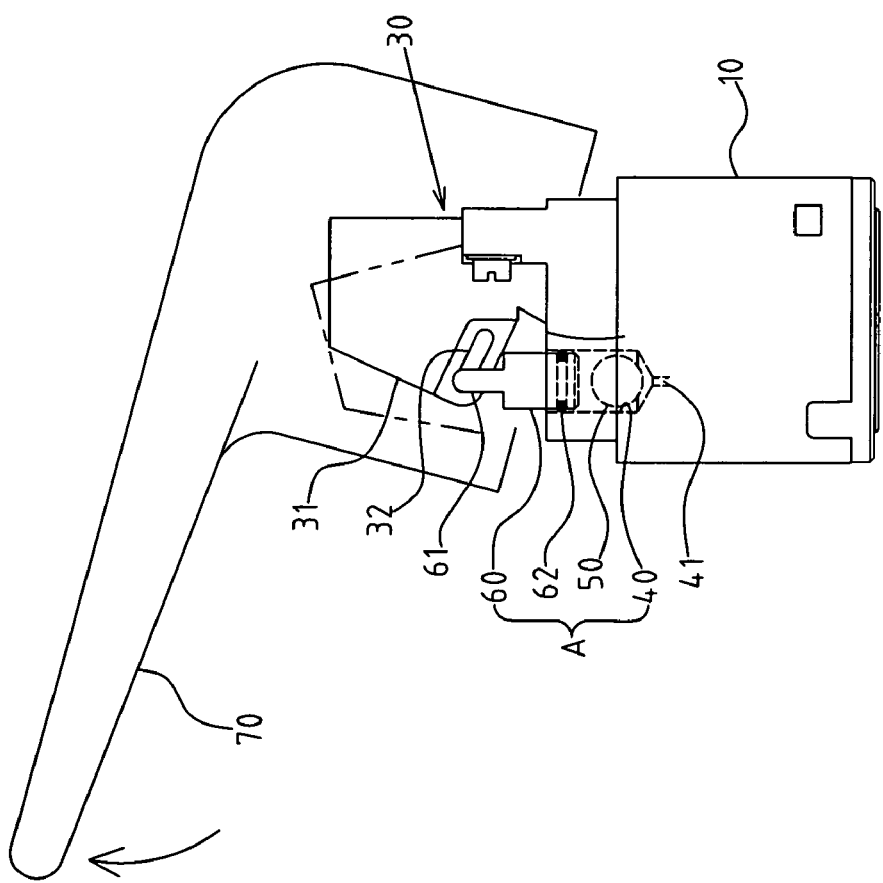
Figure 7:
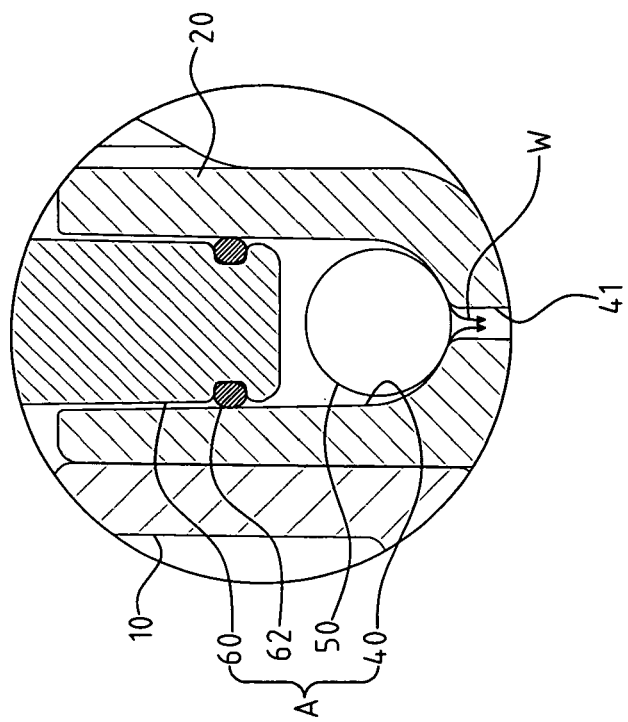
FIG. 7 shows a partial sectional view of the slow-descending device of FIG. 6.

Because the swing end 31 of the valve shaft 30 is connected to the faucet knob 70, as shown in FIGS. 4 and 5, when the user is turning on the faucet knob 70, the swing end 31 of the valve shaft 30 is moved. By movement of the swing end 31, the joint 61 at the top of the piston 60 moves upward by the swing end 31. When the piston 60 is moving upward, it creates vacuum force inside the piston slot 40. Meanwhile, the sealer 50 is sucked up and broke off from the venthole 41, which conducts air W inside the piston slot 40 from the venthole 41. The vacuum inside the piston slot 40 is lost as well; therefore, the upward movement of the piston 60 is smooth. Also, when the user turns on the faucet knob 70, the slow-descending device A mentioned herein does not create any effect. Because of the sealer 50 has weight, the condition where it is sucked up and broke off from the venthole 41 is temporary. When the air A enters into the piston slot 40, the sealer 50 will fall due to its weight and returns to the condition where it is sealed to the venthole 41 (which is shown in FIG. 3).

Figure 6:
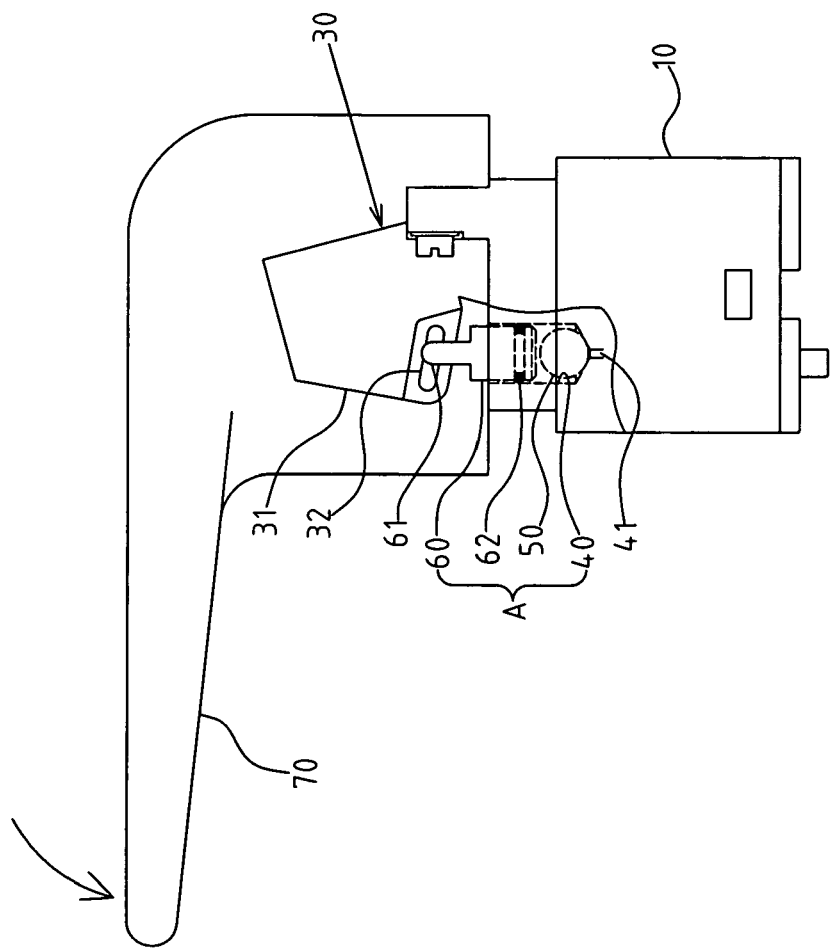
FIG. 6 shows a side elevation view of the operation of the present invention, in which the water is turned off.

As shown in FIG. 6, 7, when the user desires to turn off the faucet knob 70, it also moves the swing end 31 of the valve shaft 30, and with the movement of the swing end 31, the joint 61 of the piston 60 is moved downward by the swing end 31. When the piston 60 is moved downward, it creates a pushing force inside the piston slot 40. At this time, the air pressure inside the piston slot 40 is unable to be released, and it must push against the weight of the sealer 50, then be released from the hole between the sealer 50 and venthole 41, which forms certain resistance of air pressure, and creates anti resistance force against the piston 60. Thus, the downward movement of the piston 60 has resistance. Also, when the user is turning off the faucet knob 70, the slow-descending device A creates a slow-descending effect for the movement of the swing end 31 of the valve shaft 30, and slows down the change in water pressure when turning off water, which reduces the damage to the water channel and the structure of the porcelain, being the main purpose of the present invention.

I claim:

1. A ceramic valve structure, comprising:
    a ceramic valve body, having a containment slot on a top thereof;
    a valve shaft base, being placed inside said containment slot and being rotatable, said valve shaft base having a valve shaft slot;
    a valve shaft with a bottom thereof placed inside said valve shaft slot, a top of said valve shaft being a swing end;
    a slow-descending device, being placed between said swing end and said valve shaft base, said slow-descending device comprising:
        a piston slot, being placed on one side of said valve shaft base, a bottom of a venthole being connected to a bottom of said valve shaft base, and
        a sealer, being placed on a top of the venthole of said piston slot, said venthole being sealable; and
    a piston, having a bottom thereof placed inside said piston slot in a sealed condition, a joint being connected to a pre-determined area on a swing end of a valve stick.

2. The ceramic valve structure defined in claim 1, wherein said sealer is comprised of a bearing and cone.

3. The ceramic valve structure defined in claim 1, wherein the bottom of the piston can be sealed to the piston slot with an O shaped ring.

4. The ceramic valve structure defined in claim 1, wherein said joint of a top of said piston is comprised of a hook, a horizontal slot being placed on a corresponding part of the swing end of the valve stick for the joint of the piston to connect.

* * * * *